United States Patent
Seng et al.

(10) Patent No.: US 6,735,029 B2
(45) Date of Patent: May 11, 2004

(54) EQUALIZED RESPONSE EXTRACTION FROM A READ CHANNEL

(75) Inventors: Edmun ChianSong Seng, Singapore (SG); UttHeng Kan, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 192 days.

(21) Appl. No.: 09/981,052

(22) Filed: Oct. 15, 2001

(65) Prior Publication Data

US 2002/0057508 A1 May 16, 2002

Related U.S. Application Data

(60) Provisional application No. 60/247,333, filed on Nov. 10, 2000.

(51) Int. Cl.$^7$ .................................................. G11B 5/09
(52) U.S. Cl. ............................ 360/46; 360/65; 360/31
(58) Field of Search ............................ 360/46, 51, 65, 360/31, 75

(56) References Cited

U.S. PATENT DOCUMENTS

| | | | | |
|---|---|---|---|---|
| 5,081,547 A | * | 1/1992 | Howell | 360/31 |
| 5,121,262 A | | 6/1992 | Squires et al. | 360/46 |
| 5,311,376 A | | 5/1994 | Joan et al. | 360/51 |
| 5,341,249 A | | 8/1994 | Abbott et al. | 360/46 |
| 5,355,261 A | | 10/1994 | Taratorin | 360/53 |
| 5,383,064 A | | 1/1995 | Harman | 360/45 |
| 5,594,597 A | * | 1/1997 | Padden | 706/20 |
| 5,742,446 A | | 4/1998 | Tian et al. | 360/75 |
| 5,822,139 A | * | 10/1998 | Ayabe | 360/31 |
| 6,003,051 A | * | 12/1999 | Okazaki | 708/3 |
| 6,014,768 A | * | 1/2000 | Lee et al. | 714/795 |
| 6,121,778 A | * | 9/2000 | Moore | 324/619 |
| 6,124,992 A | | 9/2000 | Pham | 360/46 |
| 6,252,731 B1 | | 6/2001 | Sloan et al. | 360/31 |
| 6,262,544 B1 | | 7/2001 | Disser et al. | 318/245 |
| 6,282,045 B1 | * | 8/2001 | Glover | 360/73.03 |
| 6,407,875 B1 | * | 6/2002 | Pierson | 360/46 |
| 6,441,983 B1 | * | 8/2002 | Philpott et al. | 360/67 |

FOREIGN PATENT DOCUMENTS

JP 408180338 * 7/1996 ........... G11B/5/455

OTHER PUBLICATIONS

"Implementation of PRML in a Rigid Disc Drive" by J.D. Coker et al., IEEE Transactions on Magnetics, vol. 27, No. 6, Nov. 1991.

* cited by examiner

*Primary Examiner*—David Hudspeth
*Assistant Examiner*—Glenda P Rodriguez
(74) *Attorney, Agent, or Firm*—Westman, Champlin & Kelly

(57) ABSTRACT

A method and apparatus for obtaining optimum parameter values for a read channel employed in a disc drive storage system are provided in which data having a known pattern is written on a disc surface of the disc drive storage system. The data written on the disc surface is then read to obtain a readback signal. The readback signal is passed through the read channel. A readback signal response is obtained at an output test point of the read channel. The readback signal response at the output test point is compared with a target response of the read channel at the output test point. The comparison is carried out using frequency spectral analysis. At least one parameter of the read channel is adjusted if the readback signal response substantially differs from the target response.

19 Claims, 9 Drawing Sheets

EQUALIZED RESPONSE EXTRACTION FROM A READ CHANNEL

CROSS-REFERENCE TO RELATED APPLICATION

This application claims benefit of U.S. Provisional Application No. 60/247,333, filed Nov. 11, 2000, and entitled TARGET RESPONSE EXTRACTION FROM READ CHANNEL.

FIELD OF THE INVENTION

The present invention relates generally to data storage systems. More particularly, the present invention relates to the selection of read channel parameter values to optimize the operational performance of a disc drive data storage system.

BACKGROUND OF THE INVENTION

A typical disc drive includes one or more discs mounted for rotation on a hub or spindle. A typical disc drive also includes a transducer supported by a hydrodynamic air bearing which flies above each disc. The transducer and the hydrodynamic air bearing are collectively referred to as a data head. A drive controller is conventionally used for controlling the disc drive based on commands received from a host system. The drive controller controls the disc drive to retrieve information from the discs and to store information on the discs.

An electromechanical actuator operates within a negative feedback, closed-loop servo system. The actuator moves the data head radially over the disc surface for track seek operations and holds the transducer directly over a track on the disc surface for track following operations.

In a disc drive employing magnetic discs, for example, information is typically stored in concentric tracks on disc surfaces by providing a write signal to the data head to encode flux reversals on the disc surface. The flux reversals represent the data to be stored. In retrieving data from the disc, the drive controller controls the electromechanical actuator so that the data head flies above the magnetic disc, sensing the flux reversals on the magnetic disc, and generating a read signal based on those flux reversals. The read signal is typically conditioned and then decoded by the drive controller to recover data represented by flux reversals stored in the magnetic disc, and consequently represented in the read signal provided by the data head.

A typical readback system includes the data head, a preamplifier, a read channel including filtering circuitry and data detection circuitry, and error detection and correction circuitry. The readback system can be implemented either as discrete circuitry, or in a drive controller associated with the disc drive.

In disc drives, it is important that the error rate per number of bits recovered (the bit error rate) be maintained at a relatively low level. Thus, during disc drive development and manufacture, tests are conducted to determine the accuracy of data interpretation by the read channel of the readback system. Current techniques for obtaining optimum read channel parameter values typically involve selecting a set of initial parameter values, writing test data on one or more tracks, reading the data and calculating the bit error rate for the initial set of values. The process is then repeated with individual parameters of the initial set of parameter values sequentially incremented so that a population of error rates is obtained for a range of parameter values. Optimum parameter values are then selected from the range of parameter values. These techniques are complex and involve numerous calculations. Further, the bit error rate only represents the total effect of equalization of the read channel and the response of individual component circuits of the read channel are not examined during the process of selection of optimum parameter values.

The present invention provides a solution to these and other problems and offers other advantages over the prior art.

SUMMARY OF THE INVENTION

Various embodiments of the present invention relate to obtaining optimum parameter values for a read channel employed in a disc drive storage system by spectral analysis of outputs of component circuits of the read channel, thereby addressing the above-mentioned problems.

A method and apparatus for obtaining optimum parameter values for a read channel employed in a disc drive storage system are provided in which data having a known pattern is written on a disc surface of the disc drive storage system. The data written on the disc surface is then read to obtain a readback signal. The readback signal is passed through the read channel. A readback signal response is obtained at an output test point of the read channel. The readback signal response at the output test point is compared with a target response of the read channel at the output test point. The comparison is carried out using frequency spectral analysis. At least one parameter of the read channel is adjusted if the readback signal response substantially differs from the target response.

These and various other features as well as advantages which characterize various embodiments of the present invention will be apparent upon reading of the following detailed description and review of the associated drawings.

BRIEF DESCRIPTION OF THE DRAWINGS

FIGS. 5-1 to 5-3 show frequency domain plots of an exemplary pseudo random sequence that can be used in embodiments of the present invention.

FIGS. 6-1 and 6-2 show plots illustrating a comparison between results obtained by prior art techniques of tuning a read channel and results obtained using embodiments of the present invention.

DETAILED DESCRIPTION OF ILLUSTRATIVE EMBODIMENTS

Figure 1:
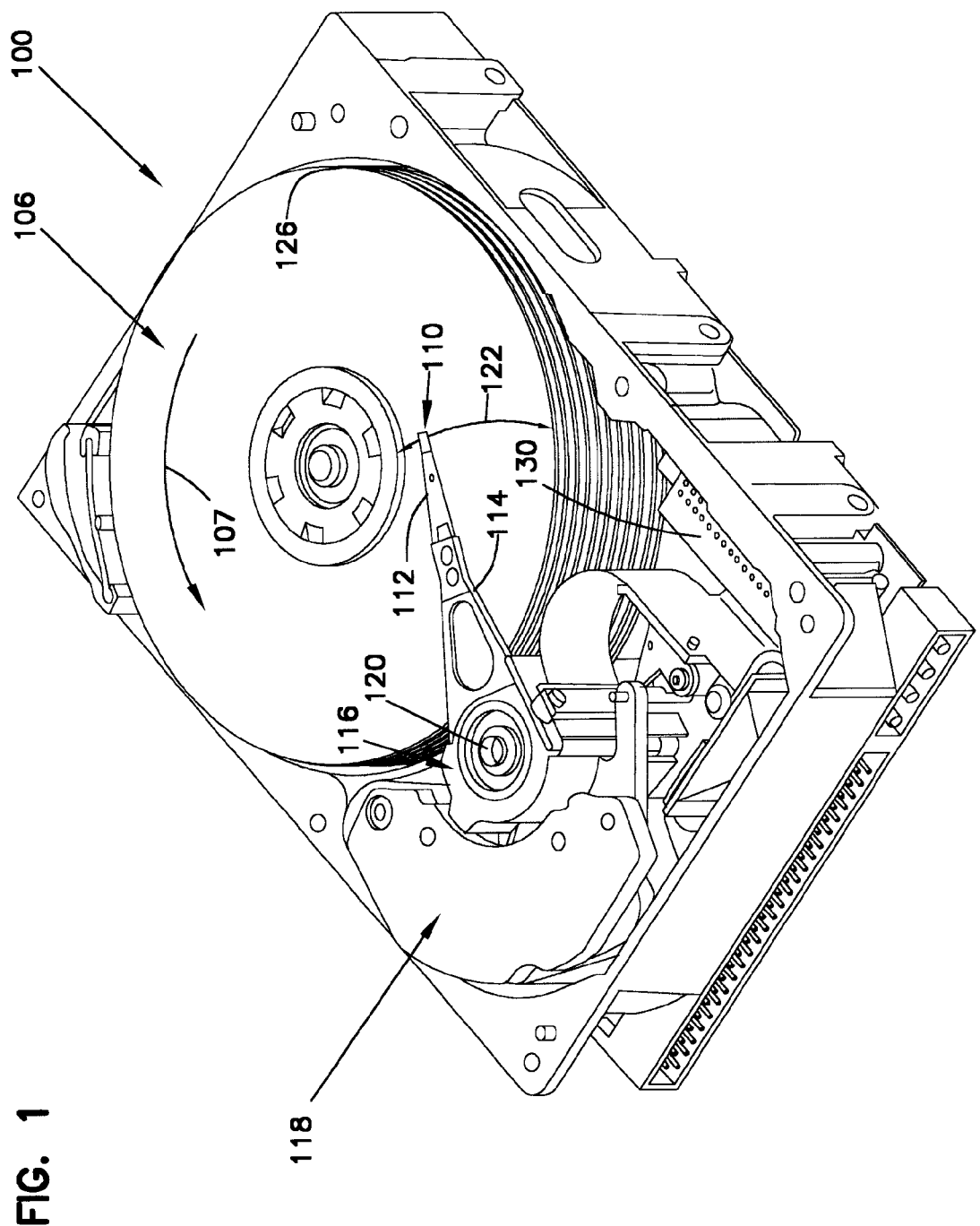
FIG. 1 is a perspective view of a disc drive storage system with which various embodiments of the present invention are useful.

Referring now to FIG. 1, a disc drive storage system 100 with which the present invention is useful is shown. Disc drive 100 includes a disc pack 126 having storage surfaces 106. The disc pack 126 includes a stack of multiple discs and read/write head assembly 112 includes a read/write transducer or head 110 for each stacked disc. Disc pack 126 is spun or rotated as shown by arrow 107 to allow read/write head assembly 112 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112. Disc drive 100 includes electronic circuitry 130 for controlling the operation of the disc drive 100 and transferring data in and out of the disc drive.

Figure 2:
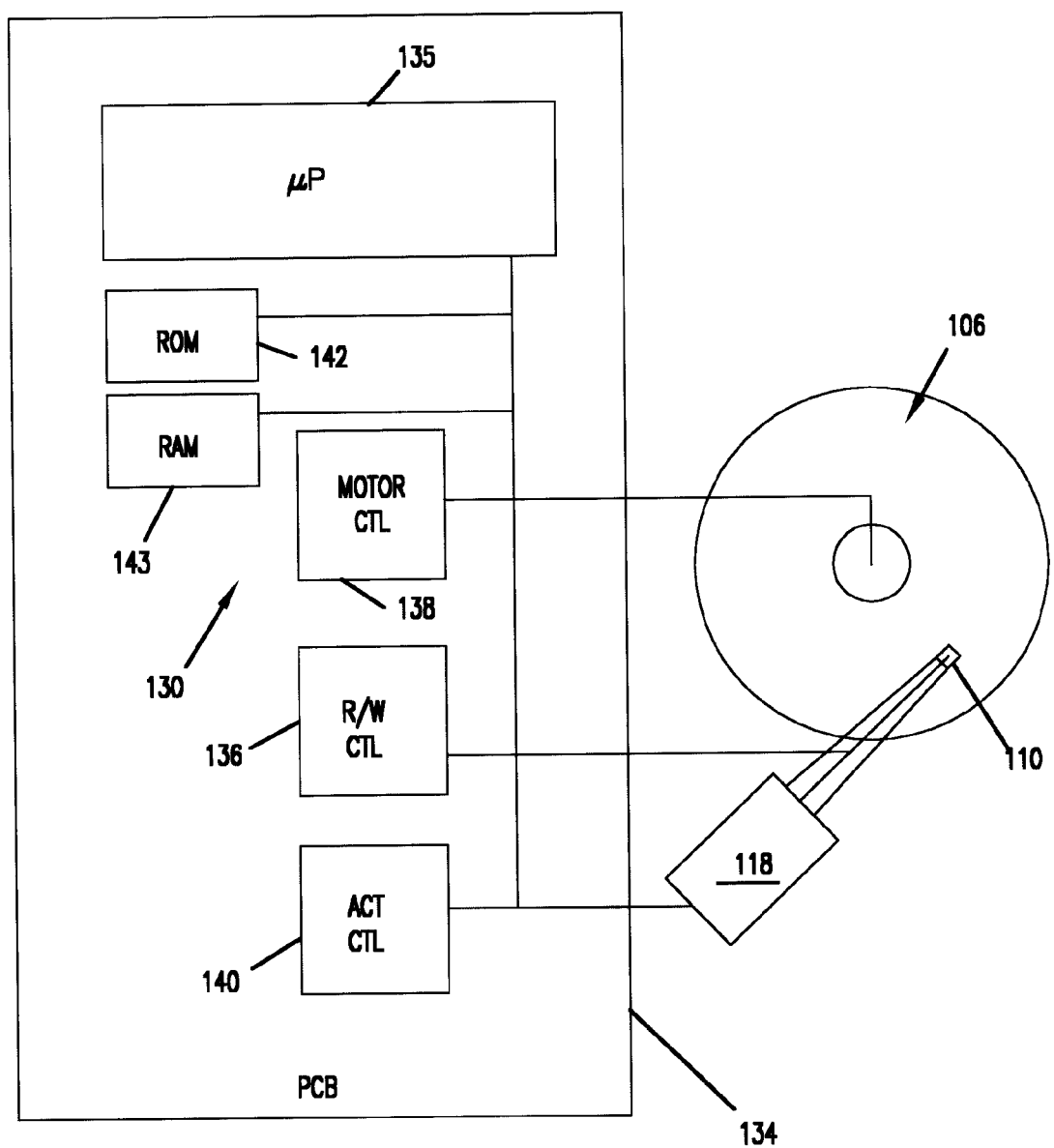
FIG. 2 is a simplified block diagram of a disc storage system with which various embodiments of the present invention are useful.

Referring now to FIG. 2, a simplified block diagram of a disc storage system including components of control circuitry 130 on printed circuit board (PCB) 134, is shown. A microprocessor 135, such as digital signal processor (DSP), is coupled to each of a read/write control 136, spindle motor control 138, actuator control 140, read-only memory (ROM) 142 and random access memory (RAM) 143. The microprocessor 135 sends data to and receives data from disc surfaces 106 via the read/write control 136 and transducer head 110.

The microprocessor 135 operates according to instructions stored in the ROM 142 to generate and transmit control signals to each of the spindle motor control 138 and the actuator control 140.

The spindle motor control 138 is responsive to the control signals received from the microprocessor 135 to generate and transmit a drive voltage to a spindle motor (not shown) to cause disc pack 126 (FIG. 1) to rotate at an appropriate rotational velocity.

Similarly, the actuator control 140 is responsive to the control signals received from the microprocessor 135 to generate and transmit a voltage to the voice coil motor 118 to controllably rotate the read/write heads 110, via the actuator arms 114, to preselected radial positions over storage disc pack 126. The magnitude and polarity of voltage generated by the actuator control 140, as a function of the microprocessor control signals, determines the radial direction and speed of the read/write heads 110.

When data to be written or read from one of the discs of disc pack 126 is stored on a data track different from the current radial position of the read/write heads 110, the microprocessor 135 determines the current radial position of the read/write heads 110 and the radial position of the data track where the read/write heads 110 are to be relocated. The microprocessor 135 then implements a seek operation wherein the control signals generated by the microprocessor 135 for the actuator control 140 cause the voice coil motor 118 to move the read/write heads 110 from the current data track to a destination data track at the desired radial position.

When the actuator is moved from the read/write heads 110 to the destination data track, a multiplexer (not shown) is used to couple the heads 110 over the specific data track to be written or read, to the read/write control 136, as is generally known in the art. The read/write control 136 includes a read channel that is described in FIG. 3 below. The RAM 143 can be used to buffer data read from or to be written to storage surfaces 106.

Figure 3:
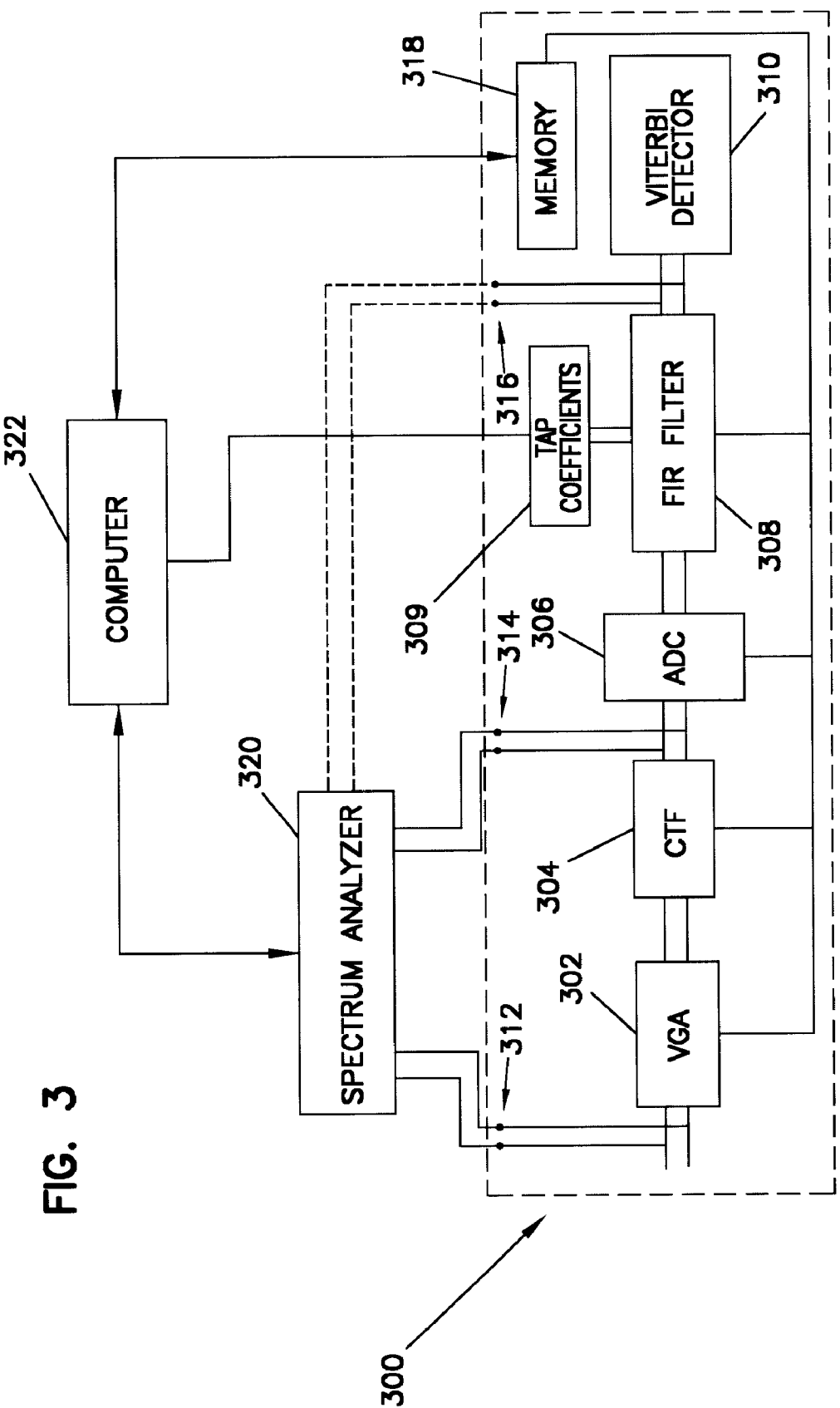
FIG. 3 is simplified block diagram of a read channel in accordance with an embodiment of the present invention.

An illustrative embodiment of the present invention is directed to a method of obtaining optimum parameter values for a read channel such as 300, shown in FIG. 3. Read channel 300 is included in read/write control 136 (FIG. 2). Electrical signals transduced by data head 110 (FIG. 1) from the magnetic transitions on the disc surface 106 (FIG. 1), are processed by a preamplifier (not shown) whose output is coupled to an input of a variable gain amplifier (VGA) 302. The VGA 302 is used to maintain a constant signal amplitude for the signals transmitted into the read channel 300 while the input to the VGA 302 varies in amplitude.

An output of the VGA 302 is coupled to a continuous time filter (CTF) 304. The CTF 304 provides filtering and partial amplitude and phase equalization for the signals transmitted to the read channel 300. An output of the CTF 304 is coupled to an analog-to-digital converter (ADC) 306 which transfers a digitized (sampled) read signal to an input of a finite impulse response Digital (FIR) filter 308 for filtering and conditioning the samples received from ADC 306. Filter tap coefficients, shown as block 309, can be extracted from FIR filter 308 and used for analysis of the read channel 300. Read channel 300 may include an analog FIR filter instead of digital FIR filter 308. If an analog FIR filter is employed, ADC 306 would be coupled to the output of the analog FIR filter instead of the input of digital FIR filter 308.

An output of the FIR filter 308 is coupled to an input of a Viterbi detector 310. The Viterbi detector 310 electronically implements known Viterbi algorithms to decode the samples of electrical signals derived from the transduction of magnetic transitions by the data head 110. The digital information represents the data stored on the disc surfaces, and the output of the Viterbi detector 310 provides digital signals that, after further processing, can be output by the disc drive as data for use by a computer. Read channel 300 also includes an input test point 310, an intermediate test point 312 and an output test point 314 which provide electrical connection points for analysis devices to capture and reconstruct signals form different electronic components of the read channel 300. Memory register 318 stores parameter values of different electronic components of the read channel 300.

As can be seen in FIG. 3, a spectrum analyzer 320 and a computer 322 are coupled to the read channel 300. Spectrum analyzer 320 and computer 322 are employed to analyze signals from different electronic components of the read channel 300 and to update memory 318 with optimum parameter values obtained as a result of the analysis performed.

According to a preferred embodiment of the present invention, a 31-bit pseudo random sequence (PRS31) is first written on to a test track of disc surface 106 (FIG. 1). The PRS31 is then read from the test track by transducer head 110 (FIG. 1) to obtain an analog readback signal. The readback signal is processed by a preamplifier (not shown) whose output is coupled to the input of the VGA 302, described above. The analog readback signal at the input of the VGA 302 is channeled into spectrum analyzer 320 through input test point 312 to obtain a readback signal spectrum. With the help of computer 322, which is coupled to spectrum analyzer 320, peaks in the readback signal spectrum are detected and data points corresponding to the peaks are extrapolated to obtain a smooth spectrum plot for the readback signal. An intermediate signal of the read channel 300 at the output of CTF 304 is channeled to spectrum analyzer 320 through intermediate test point 314. Spectral analysis is also performed on the intermediate signal to obtain a smooth spectrum plot. A first transfer function (TF1) is then obtained by dividing the intermediate output spectrum by the readback signal spectrum. A second transfer function is (TF2) is calculated for digital FIR filter 308 from filter tap coefficients 309 that are extracted from FIR filter 308. A resultant transfer function for the read channel is obtained by multiplying TF1 and TF2. The resultant transfer function represents the change between the signal at the input of the VGA 302 and the output of the digital FIR filter 308, which is also the input of Viterbi detector 310. Since the input at the VGA 302 and the resultant transfer function are known, the resultant read channel response at the output of the digital FIR filter 308 is obtained by multiplying the input readback signal at the VGA 302 by the resultant transfer function.

If an analog FIR filter were used instead of digital FIR filter 308, then the analog output of the filter could be obtained by directly connecting spectrum analyzer 320 to output test point 316. An extraction of the filter tap coefficients 309 and the calculation of transfer functions would not be required for an analog FIR filter.

A frequency spectrum plot of the resultant read channel response is compared with a plot of a target read channel response. The target response of the read channel is obtained using known techniques. If there are substantial differences between the resultant read channel response and the target response then values of one or more parameters of component circuits of the read channel are modified in memory 318. Spectral analysis of outputs of different component circuits of the read channel 300 is repeated for the updated parameter set using the procedures described above.

The above procedures are repeated until the read channel response is equalized (the resultant read channel response is substantially similar to the target response of the read channel). The parameter values used to obtain the equalized read channel response are preserved in memory 318. The various calculations and updates of parameter values described above are carried out by computer 322. Embodiments of the present invention are particularly useful for evaluation of the read channel during disc drive development and failure analysis.

Figure 4:
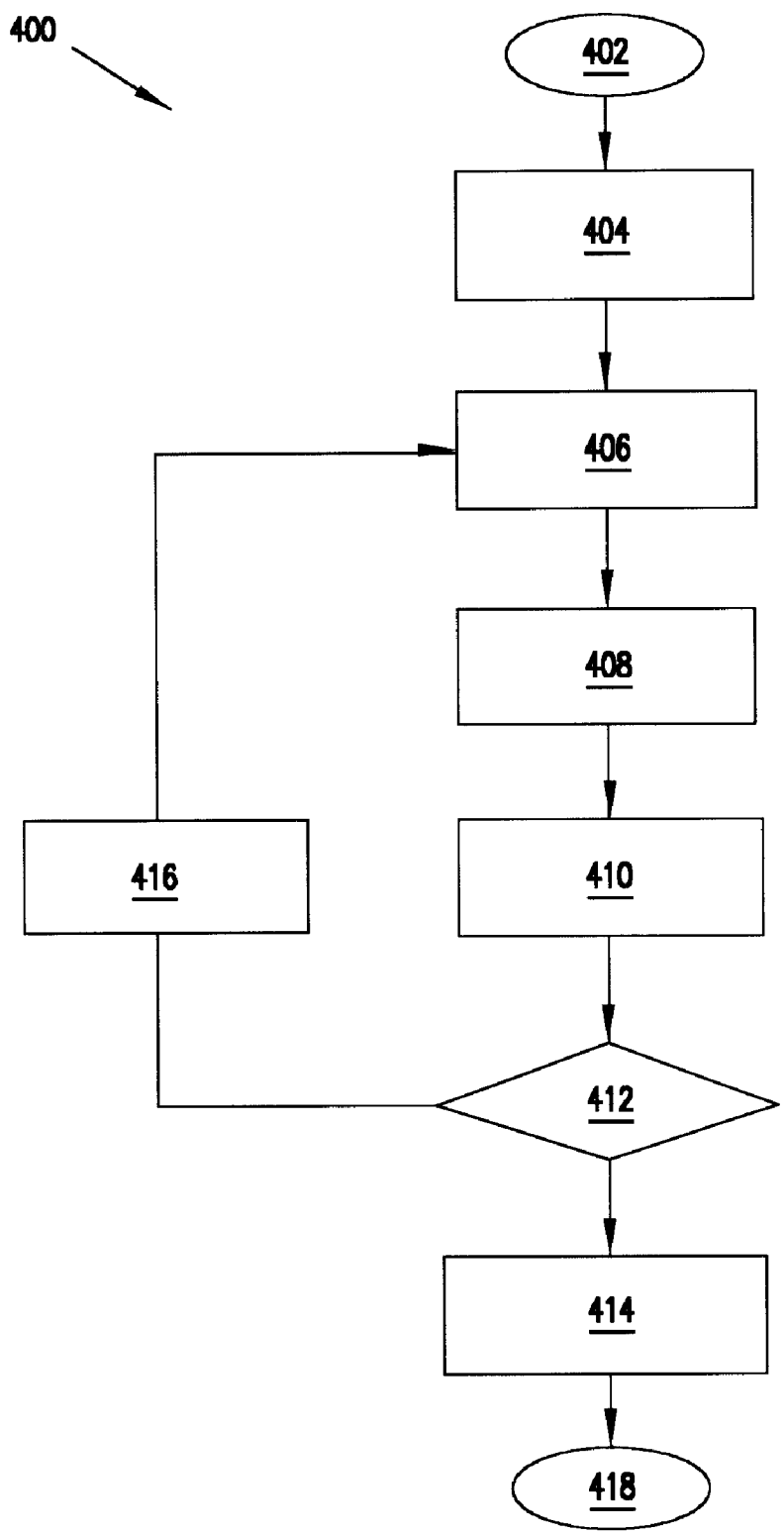
FIG. 4 shows a flow chart of a method of obtaining optimum parameter values for a read channel employed in a disc drive storage system in accordance with an embodiment of the present invention.

Referring now to FIG. 4, a flow chart 400 of a method of obtaining optimum parameter values for a read channel employed in a disc drive storage system in accordance with an embodiment of the present invention, is shown. The method begins at step 402 and proceeds to step 404 where a signal having a known pattern is written on a disc surface of the disc drive storage system. At step 406, the signal written on the disc surface is read to obtain a readback signal. At step 408, the readback signal is passed through the read channel. At step 410, a readback signal response is obtained at output test point of the read channel. At step 412, the readback signal response at the output test point is compared with a target response of the read channel at the output test point. The comparison is carried out using frequency spectral analysis. If the readback signal response is substantially similar to the target response, then the read channel parameter values are preserved in memory at step 414 and the method ends at step 418. If the readback signal response is substantially different from the target response, then at least one parameter of the read channel is adjusted at step 416 and control is returned to step 406. The process is repeated until the readback signal response is substantially similar to the target response.

FIGS. 5-1 to 5-3 and 6-1 and 6-2 illustrate different frequency domain plots of signals received from different test points of the read channel.

Figures 1, 5:
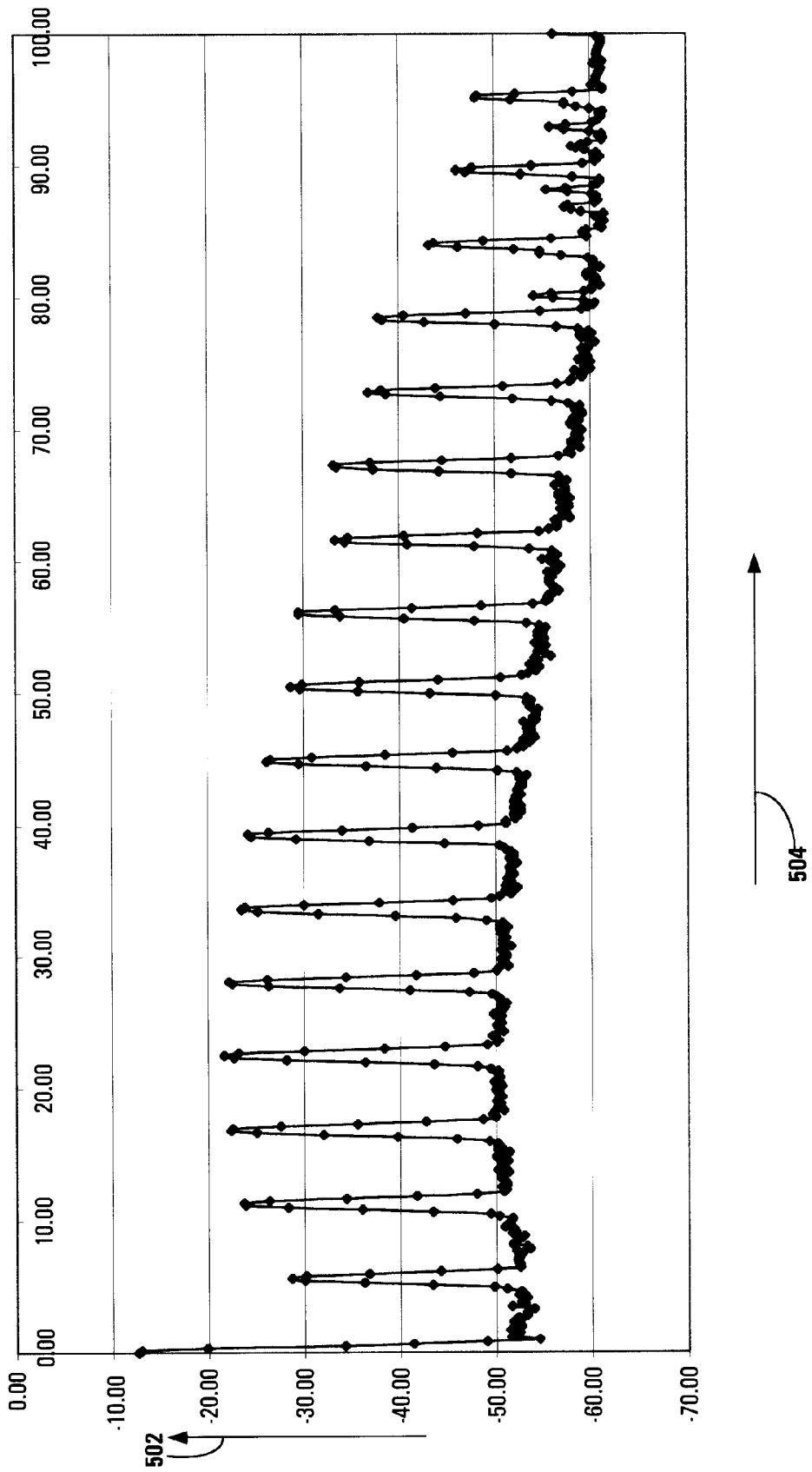
Figures 2, 5:
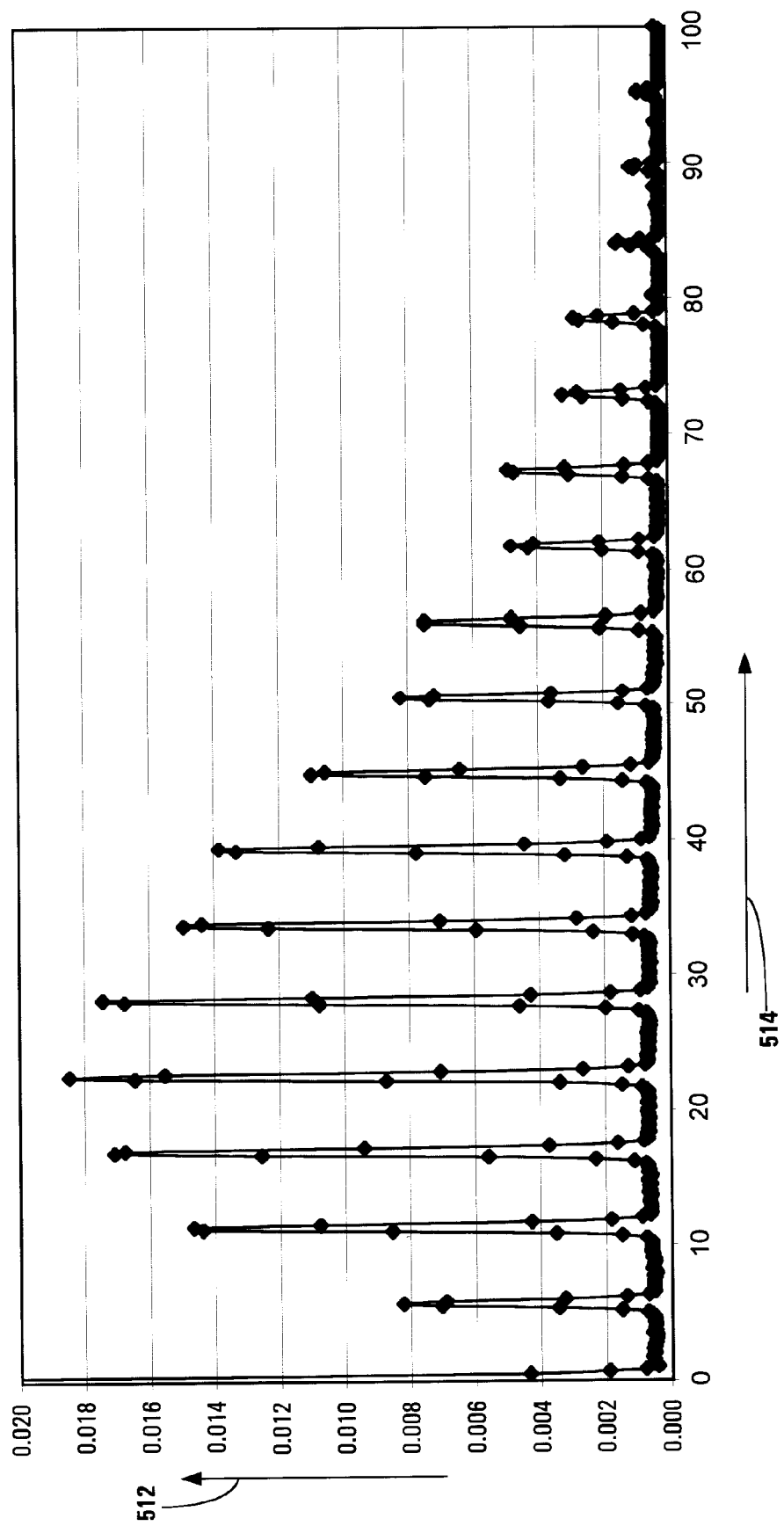
Figures 3, 5:
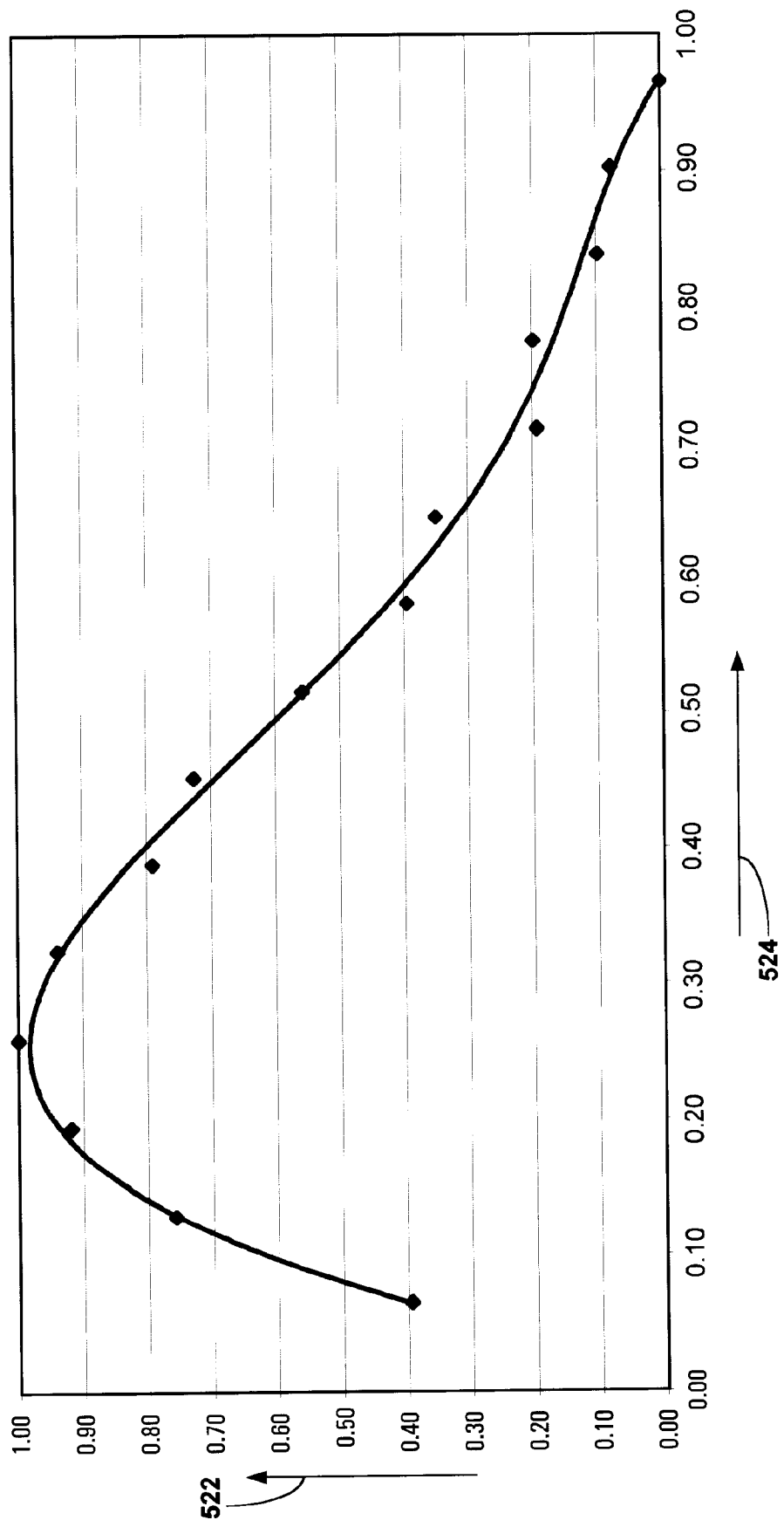

Referring now to FIGS. 5-1 to 5-3, frequency domain plots of an exemplary PRS31 signal retrieved from an input test point (such as 312) of a read channel (such as 300) are shown. FIG. 5-1 is a plot of data points of the exemplary PRS31 signal retrieved from a spectrum analyzer (such as 320) in power (dBm) along vertical axis 502 as a function of frequency in MHz along horizontal axis 504. In this example, only the first fifteen peaks of the PRS31 pattern are retained for further spectral analysis, and the remaining points are discarded. The units of the fifteen peak points are converted from power in dBm to RMS voltage to obtain the plot illustrated in FIG. 5-2. The plot of FIG. 5-2 shows the PRS31 signal amplitude in RMS voltage (Vrms) along vertical axis 512 as a function of frequency in MHz along horizontal axis 514. The amplitude and frequency of the fifteen peak points are then normalized to obtain a smooth plot as shown in FIG. 5-3. The normalized amplitude of the peak points is shown along vertical axis 522 as a function of normalized frequency along horizontal axis 524. Signals retrieved from intermediate test point 314 are also normalized in accordance with the above-described procedure.

Figures 1, 6:
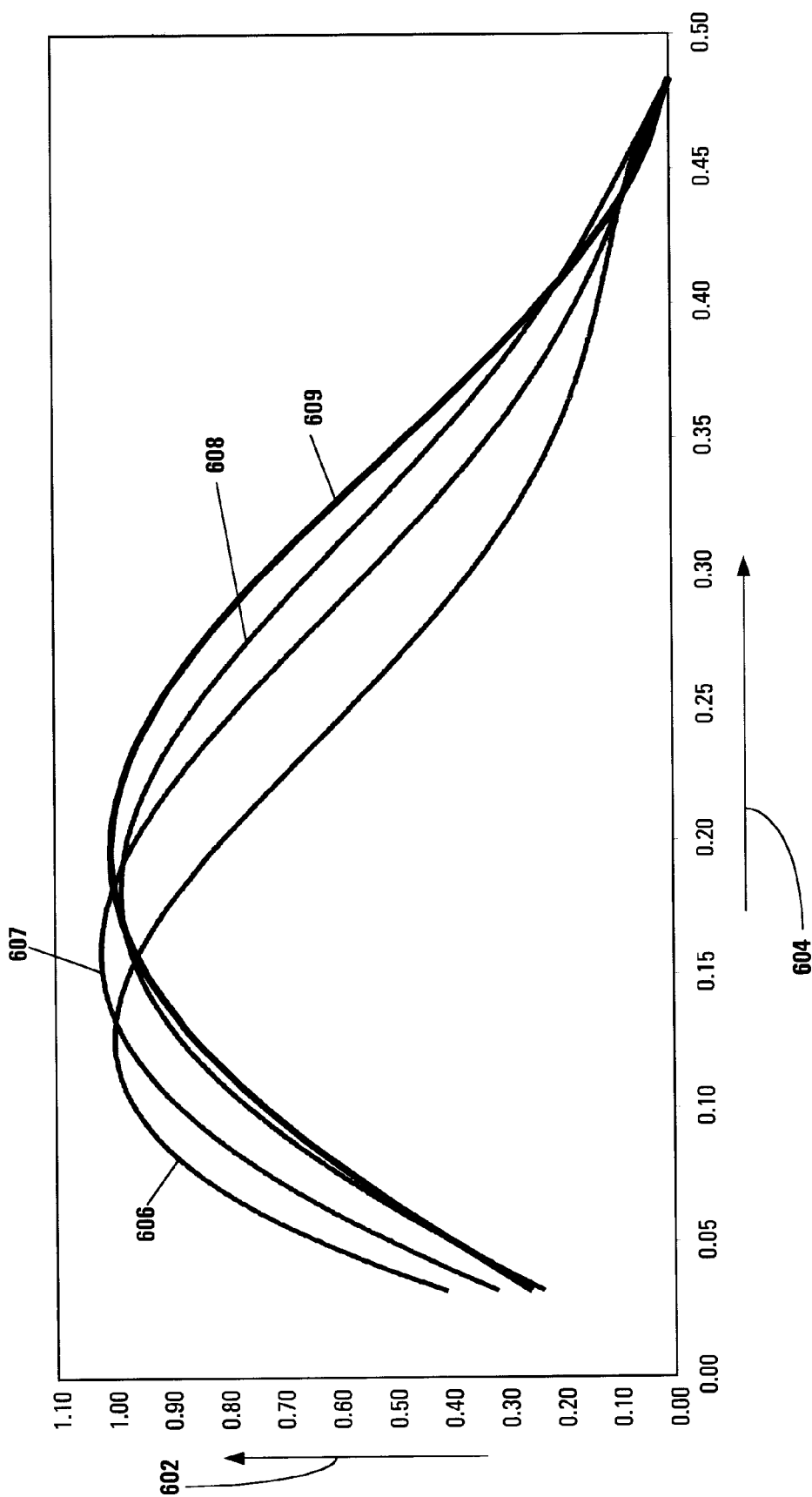
Figures 2, 6:
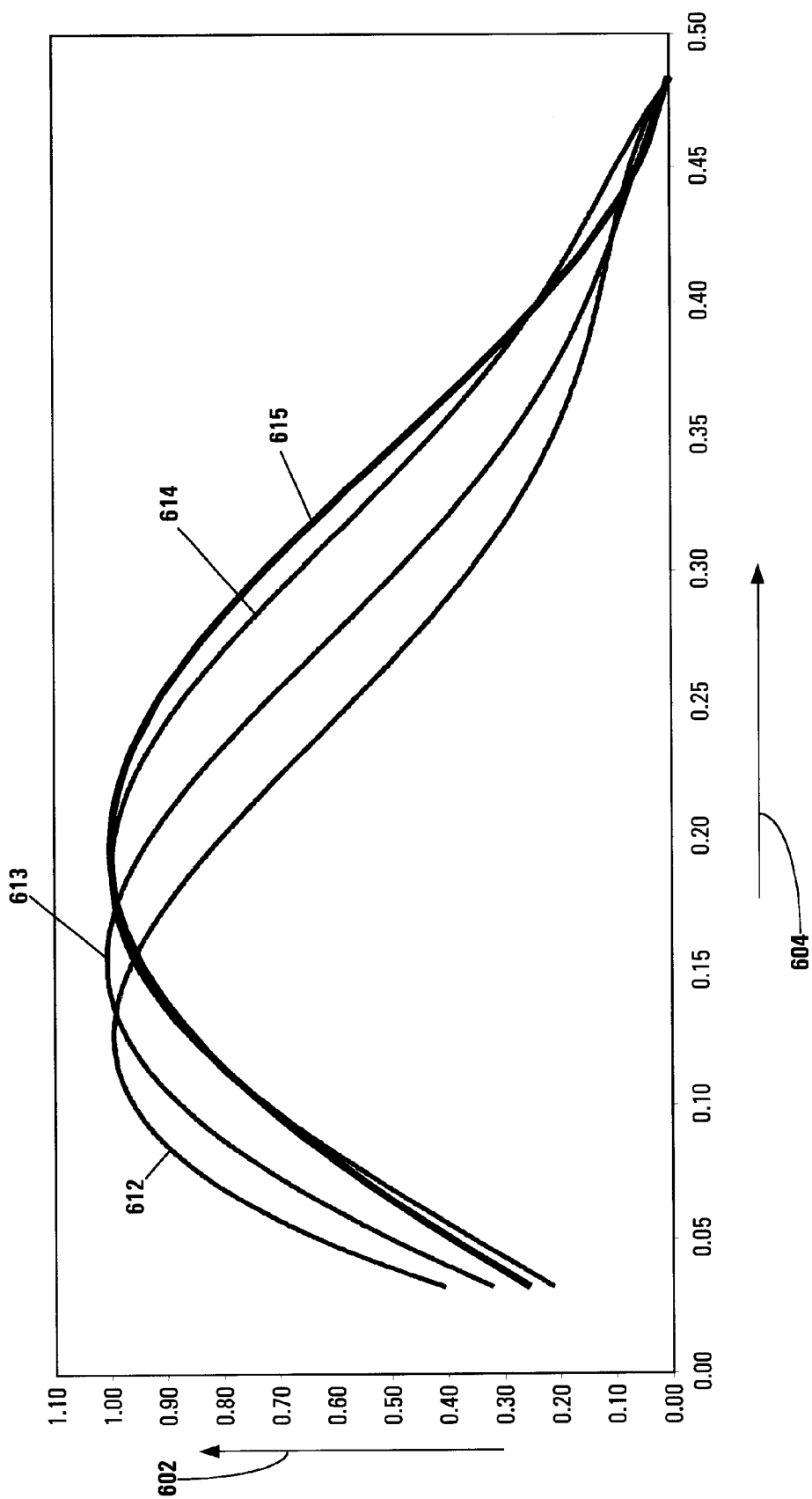

FIGS. 6-1 and 6-2 show plots illustrating improvements over prior art read channel tuning techniques that are achieved by embodiments of the present invention. An experiment was conducted to examine the equalized response of a read channel (such as 300) that was optimized using prior art techniques (bit error rate calculation techniques), described above. The optimized cutoff frequency (Fc) and the boost frequency (Fb) of the CTF (such as 304) calculated using prior art techniques was Fc=1A hex and Fb=2B hex stored in a memory register (such as 318). The digital FIR filter (such as 308) of the read channel included three different tap coefficient settings (1, 2 and 3), with each setting corresponding to a different number of tap coefficients. The optimized FIR setting determined using prior art techniques had a tap coefficient setting of 1. FIG. 6-1 illustrates plots of signals received by a spectrum analyzer at different test points of the read channel with the above prior art parameter values. The vertical axis 602 indicates normalized amplitude and the horizontal axis 604 indicates normalized frequency. Plot 606 is the normalized response curve for a known signal pattern at the input of a VGA (such as 302) and plot 607 is obtained at the output of a CTF (such as 304). Plot 608 is the normalized response curve at the input of a Viterbi detector (such as 310) and plot 609 is the target response of the read channel. Based on an examination of the plots (606–609) using techniques described in embodiments of the present invention, the values of Fc, Fb and the FIR tap coefficient setting were updated (Fc was increased and Fb was decreased). The final parameter values were Fc=1D hex, Fb=1E hex with an FIR tap coefficient setting of 2. Plots 612 (input of VGA), 613 (output of CTF), 614 (input of Viterbi detector) and 615 (target response) were obtained with the new parameter values. A comparison of FIGS. 6-1 and 6-2 indicates that the read channel response at the input of the Viterbi detector more closely matches the target response in FIG. 6-2 (plots 614 and 615 more closely match than plots 608 and 609). Bit error rates obtained also improved over the prior art.

Thus, unlike the prior art techniques which generally involve selecting parameter values after obtaining a number of bit error rate readings, embodiments of the present invention provide frequency domain plots of outputs of different component circuits of the read channel. These plots provide for visual examination of the behavior of the read channel, thereby greatly enhancing the understanding of the performance and capability of the read channel under evaluation.

In summary, a method embodiment for obtaining optimum parameter values for a read channel employed in a disc drive storage system is provided in which data having a known pattern is written on a disc surface of the disc drive storage system in a step such as 404. The data written on the disc surface is then read to obtain a readback signal in a step such as 406. The readback signal is passed through the read channel in a step such as 408. A readback signal response is obtained at an output test point of the read channel in a step such as 410. The readback signal response at the output test point is compared with a target response of the read channel at the output test point in a step such as 412. The comparison is carried out using frequency spectral analysis. At least one parameter of the read channel is adjusted if the readback signal response substantially differs from the target response in a step such as 416.

Another embodiment is a configurable read channel (such as 300) for use in a disc storage system (such as 100) having a storage medium (such as 106) for storing data and a transducer head (such as 110) for reading information from and writing information on the storage medium (such as 106). The read channel (such as 300) includes a set of electronic components (such as 302, 304, 306, 308, 310) coupled in a predetermined arrangement, for receiving and processing information read by the transducer head (such as 110) from the storage medium (such as 106). A set of test points (312, 314 and 316) are electrically coupled to inputs and outputs of selected components of the set of electronic components, the test points are adapted to connect to analysis devices (such as 320). A memory (such as 318) stores parameter values that are a function of spectral analysis of input and output signals from different components of the set of electronic components.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements of the read channel may vary depending on the particular application for the disc storage system while maintaining substantially the same functionality without departing from the scope and spirit of the present invention. In addition, although the preferred embodiment described herein is directed to obtaining optimum parameter values for a read channel employed in a disc storage system, it will be appreciated by those skilled in the art that the teachings of the present invention can be applied to other systems, like magnetic, optical or other storage system techniques that employ read channels, without departing from the scope and spirit of the present invention.

What is claimed is:

1. A method of obtaining optimum parameter values for a read channel comprising:
   (a) writing data having a known pattern on a storage medium;
   (b) reading the data written in step (a) to obtain an analog readback signal;
   (c) passing the analog readback signal through the read channel;
   (d) obtaining a read channel response at an output test point of the read channel;
   (e) comparing the read channel response at the output test point with a target response of the read channel at the output test point, wherein the comparison is carried out using spectral analysis; and
   (f) adjusting at least one parameter of the read channel if the readback signal response substantially differs from the target response.

2. The method of claim 1 further comprising repeating steps (b), (c), (d), (e) and (f) iteratively until the readback signal response is substantially similar to the target response.

3. The method of claim 2 further comprising storing parameter values of the read channel in a memory register when the readback signal response is substantially similar to the target response.

4. The method of claim 1 wherein the output test point couples to an output of a digital finite impulse response filter of the read channel.

5. The method of claim 4 wherein the obtaining the read channel response step (d) at the output of the digital finite impulse response filter comprises:
   (d1) computing a first transfer function between an input test point and an intermediate test point of the read channel;
   (d2) obtaining a second transfer function between the intermediate test point and the output test point;
   (d3) combining the first transfer function and the second transfer function to obtain a resultant transfer function; and
   (d4) obtaining the read channel response as a function of the analog readback signal at the first test point and the resultant transfer function.

6. The method of claim 5 wherein the computing the first transfer function step (d1) is carried out by spectral analysis of the analog readback signal at the input test point and the intermediate read channel response at the intermediate test point.

7. The method of claim 5 wherein the second transfer function is obtained from filter tap coefficients extracted from the digital finite impulse response filter.

8. The method of claim 1 wherein spectral analysis is carried out by a spectrum analyzer and a computer coupled to the read channel.

9. The method of claim 1 wherein the data written in step (a) is a 31-bit pseudo random data pattern.

10. The method of claim 1 wherein the adjusting step (f) includes changing a number of coefficients of a digital FIR filter of the read channel.

11. The method of claim 1 wherein the adjusting step (f) includes changing a cut off frequency of a continuous time filter of the read channel.

12. The method of claim 1 wherein the adjusting step (f) includes changing a boost frequency of a continuous time filter of the read channel.

13. A configurable read channel comprising:
   a set of electronic components, coupled in a predetermined arrangement, for receiving and processing information;
   a set of test points electrically coupled to inputs and outputs of selected components of the set of electronic components, the test points adapted to connect to analysis devices; and
   a memory adapted to store parameter values that are a function of spectral analysis of input and output signals from different components of the set of electronic components.

14. The apparatus of claim 13 wherein the analysis devices include a spectrum analyzer and a computer.

15. The apparatus of claim 13 wherein the set of test points include an input test point, an intermediate test point and an output test point.

16. A configurable read channel comprising:

a set of electronic components, coupled in a predetermined arrangement, for receiving and processing information; and means for obtaining optimum parameter values for the read channel by spectral analysis of input and output signals from different components of the set of electronic components.

17. The apparatus of claim 16 wherein the means for obtaining optimum parameter values for the read channel comprises:

a set of test points electrically coupled to inputs and outputs of selected components of the set of electronic components, the test points adapted to connect to analysis devices; and a memory adapted to store parameter values that are a function of spectral analysis of input and output signals from different components of the set of electronic components.

18. The apparatus of claim 17 wherein the analysis devices include a spectrum analyzer and a computer.

19. The apparatus of claim 17 wherein the set of test points include an input test point, an intermediate test point and an output test point.

* * * * *